UNITED STATES PATENT OFFICE.

RICHARD EMIL PIPPIG AND OTTO FRANZ FERDINAND TRACHMANN, OF KIEL, GERMANY.

PROCESS OF WASHING GAS.

SPECIFICATION forming part of Letters Patent No. 664,677, dated December 25, 1900.

Application filed August 22, 1900. Serial No. 27,701. (No specimens.)

*To all whom it may concern:*

Be it known that we, RICHARD EMIL PIPPIG and OTTO FRANZ FERDINAND TRACHMANN, subjects of the Emperor of Germany, and residents of the city of Kiel, Prussia, German Empire, have invented certain Improvements in Processes of Washing Gas; and we do hereby declare that the following is a full, clear, and exact specification of the same.

The present invention has reference to the treatment of illuminating-gas obtained from coal, wood, peat, coke, or other similar substances with certain washing ingredients in such way that gas escaping from leaks or breakages in the mains cannot have any injurious influence or action on plants, trees, and vegetation generally, such as is the case with gas obtained by the usual processes. By means of the present method the advantage is also obtained that the products of combustion of the gas are altogether free of sulfur and cannot therefore pollute the atmosphere to the extent of gas produced in the usual way.

The process consists in extracting from the gas the vapory substances—such as bisulfid of carbon, carbonic oxysulfid, oil of mustard, mercaptane, thiophene, phenol, phenates, and the like—by means of washing ingredients.

In order to condense the vapory substances and to render same easier soluble in the washing mixture, the gas is preferably cooled down considerably—say to a temperature of from 0° to −3° centigrade—as is already in practice.

For separating the aforementioned substances from the gas the latter is washed at ordinary temperature—that is, from 10° to 16° centigrade—with an amin preferably dissolved in alcohol—as, for instance, with a solution of one part of anilin ($C_6H_5NH_2$) in ten parts of alcohol ($C_2H_5OH$) of ninety-five per cent. The effect of this solution is to entirely desulfurize the gas. The amin combines with carbonic bisulfid, ($CS_2$,) forming dithiocarbamin acid and diphenylthiourea derivatives, also hydric sulfid, (hydrogen sulfid $H_2S$.) The reaction probably proceeds in two stages, involving first a combination and then a decomposition, as indicated by the equations

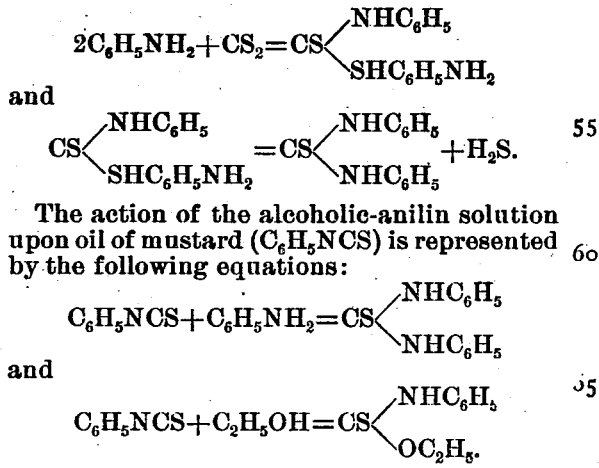

The action of the alcoholic-anilin solution upon oil of mustard ($C_6H_5NCS$) is represented by the following equations:

$$C_6H_5NCS + C_6H_5NH_2 = CS\!\!<\!\!\begin{array}{l}NHC_6H_5\\NHC_6H_5\end{array}$$

and $$C_6H_5NCS + C_2H_5OH = CS\!\!<\!\!\begin{array}{l}NHC_6H_5\\OC_2H_5.\end{array}$$

In order to make the anilin solution more effective, the gas is preferably dried before its entry into the anilin solution by being conducted over burnt lime. This procedure may, however, be dispensed with.

The hydric sulfid which is separated when carbonic bisulfid combines with anilin must be removed. This can be done by suitable absorbents for hydric sulfid either subsequent to the washing process or simultaneously with same and in the latter case by adding to the anilin mineral salts, preferably such as are soluble in alcohol or oil. For instance, we may employ a solution of bichlorid of iron in alcohol or of benzoate of iron in oil. The proportions may be, for instance, one part of anilin, one part of bichlorid of iron, and ten parts of alcohol or one part of anilin, one part of benzoate of iron, and ten parts of oil.

In case the calorific and illuminating power of the gas treated by the present process should be found to be more or less reduced the said gas after having been washed can be carbureted by carbonaceous substances in any well-known manner.

Experiments have shown that traces of bisulfid of carbon and rhodanide of ammonium in many cases still remain in the gas after same has been treated in accordance with the process described, while oxysulfid of carbon, thiophene, phenol, phenates, and mercaptane are dissolved mechanically by the alcohol or oil. In order to free the gas completely of these traces, free sulfur in any suitable solvent is added to the amin dissolved in alcohol, oil, and the like for washing the gas. One part of sulfur added to ten thousand parts of the washing solution will be sufficient for this purpose. The hydric sulfid which is generated by passing the gas through the solution is absorbed by any suitable means. The gas is then passed through a solution of a nitrite—as, for instance, nitrite of potassium or of sodium—heated to from 60° to 80° centigrade in order to free the gas of all traces of salts of ammonium. The constitution of this nitrite solution and its action are represented by the equation

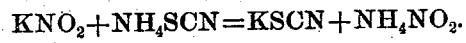

The heating of the solution causes a decomposition of the ammonium nitrite according to the equation

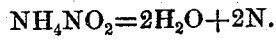

The speed at which the gas should be led over or through the washing solution is about one yard per second. The quantity of the solution depends upon the size of the apparatus and upon the proportion of impurities contained in the crude illuminating-gas.

Gas treated in this manner is absolutely free of the above-mentioned vapory substances and cannot therefore have any injurious effect on vegetation in case of leakage or breakage of the conduit.

What we claim, and desire to secure by Letters Patent, is—

1. The process of purifying illuminating-gas, which consists in washing the gas with an amin capable of combining with bisulfid of carbon.

2. The process of purifying illuminating-gas, which consists in washing the gas with an amin capable of combining with bisulfid of carbon, and soluble in alcohol.

3. The process of purifying illuminating-gas, which consists in washing the gas with an alcoholic solution of anilin.

4. The process of purifying illuminating-gas, which consists in passing the gas over burnt lime, and then treating it with an amin capable of combining with bisulfid of carbon.

5. The process of purifying illuminating-gas, which consists in treating it with anilin, (which causes the production of hydrogen sulfid,) and removing the hydrogen sulfid by means of a substance capable of absorbing it.

6. The process of purifying illuminating-gas, which consists in treating it with anilin, (which causes the production of hydrogen sulfid,) and removing the hydrogen sulfid by means of mineral salts capable of absorbing it.

7. The process of purifying illuminating-gas, which consists in treating it with an amin solution to which is added sulfur.

8. The process of purifying illuminating-gas, which consists in treating it with an amin, and then passing it through a heated solution of a nitrite.

RICHARD EMIL PIPPIG.
OTTO FRANZ FERDINAND TRACHMANN.

Witnesses:
F. ROZIKE,
H. MÖLLER,